(12) United States Patent
Drost

(10) Patent No.: US 7,578,468 B2
(45) Date of Patent: Aug. 25, 2009

(54) ACOUSTIC ABSORPTION SYSTEM FOR AN AIRCRAFT AIRFRAME

(75) Inventor: Stuart K. Drost, Shelton, CT (US)

(73) Assignee: Sikorsky Aircraft Corporation, Stratford, CT (US)

(*) Notice: Subject to any disclaimer, the term of this patent is extended or adjusted under 35 U.S.C. 154(b) by 177 days.

(21) Appl. No.: 11/017,602

(22) Filed: Dec. 20, 2004

(65) Prior Publication Data

US 2006/0145006 A1 Jul. 6, 2006

(51) Int. Cl.
*B64C 1/00* (2006.01)

(52) U.S. Cl. .................. 244/117 R; 244/119; 244/133; 181/290; 181/291; 428/71; 428/219

(58) Field of Classification Search ............ 244/117 R, 244/119, 133; 428/71, 219; 181/290, 291
See application file for complete search history.

(56) References Cited

U.S. PATENT DOCUMENTS

| | | | |
|---|---|---|---|
| 3,141,206 A * | 7/1964 | Stephens | 52/788.1 |
| 3,221,835 A | 12/1965 | Wenger | |
| 4,056,161 A * | 11/1977 | Allen, Jr. | 181/290 |
| 4,291,851 A * | 9/1981 | Johnson | 244/119 |
| 4,340,129 A | 7/1982 | Salyers | |
| 4,456,092 A | 6/1984 | Kubozuka et al. | |
| 4,848,514 A | 7/1989 | Snyder | |
| 4,940,112 A | 7/1990 | O'Neill | |
| 5,039,567 A | 8/1991 | Landi et al. | |
| 5,175,401 A | 12/1992 | Arcas et al. | |
| 5,251,849 A * | 10/1993 | Torres | 244/117 R |
| 5,300,178 A | 4/1994 | Nelson et al. | |
| 5,445,861 A | 8/1995 | Newton et al. | |
| 5,472,760 A * | 12/1995 | Norvell | 428/71 |
| 5,557,078 A | 9/1996 | Holwerda | |
| 5,670,758 A | 9/1997 | Borchers et al. | |
| 5,691,037 A | 11/1997 | McCutcheon et al. | |
| 5,695,867 A * | 12/1997 | Saitoh et al. | 428/219 |
| 5,700,527 A | 12/1997 | Fuchs et al. | |
| 5,779,193 A * | 7/1998 | Sloan | 244/117 R |
| 5,824,974 A | 10/1998 | Campbell | |
| 6,007,026 A | 12/1999 | Shorey | |
| 6,024,190 A | 2/2000 | Ritzema | |
| 6,213,430 B1 | 4/2001 | Spandorf | |
| 6,224,020 B1 | 5/2001 | Hopkins et al. | |
| 6,231,710 B1 | 5/2001 | Herup et al. | |
| 6,260,660 B1 | 7/2001 | Yoerkie, Jr. et al. | |
| 6,648,100 B2 | 11/2003 | Ebbitt | |
| 6,886,783 B2 * | 5/2005 | Guard et al. | 244/119 |
| 7,040,575 B2 | 5/2006 | Struve et al. | |
| 2005/0211838 A1* | 9/2005 | Struve et al. | 244/119 |

OTHER PUBLICATIONS

Webster's Third New International Dictionary Of The English Language Unabridged, G. & C. Merriam Company, 1964.*

* cited by examiner

*Primary Examiner*—J. Woodrow Eldred
(74) *Attorney, Agent, or Firm*—Carlson, Gaskey & Olds PC

(57) ABSTRACT

An airframe includes a mass barrier layer mounted to a multitude of frame members and adjacent to each of a multitude of foam portions to provide a contiguous layer to seal the foam portions within the respective multitude of frame voids.

10 Claims, 7 Drawing Sheets

ACOUSTIC ABSORPTION SYSTEM FOR AN AIRCRAFT AIRFRAME

BACKGROUND

The present invention relates to a noise reduction treatment for an aircraft cabin, and more particularly to a lightweight acoustic absorption system which is mounted within an airframe subcomponent to reduce aircraft interior noise levels.

Noise develops in an aircraft cabin from several sources. The most common sources are internally or externally mounted moving components, such as a transmission, engine or rotor system. Another source of cabin noise is airflow over various aircraft fuselage components. These components generate vibrations in the aircraft that propagate through the airframe and radiate into the cabin.

Noise may be a particular problem in rotary wing aircraft cabins since the rotor and transmission systems produce a significant amount of vibration directly into the airframe structure. This problem may be more pronounces in rotary wing aircraft than in fixed wing aircraft inasmuch as the dynamic components on a rotary wing aircraft are typically mounted directly above the cabin.

The main noise problem in helicopter cabins is mid to high frequency gear whine noise from the main transmission. This results in cabin noise vibrations typically from about 350 Hz through 4,000 Hz. In contrast, noise vibrations from the main and tail rotor sources are in the 20 Hz to 125 Hz range and are attenuated by up to 40+ dB by the response of the human ear.

Aircraft cabin interiors are generally designed to maintain aircraft interior noise below a certain level predetermined by competitive pressures in the marketplace. For example, executive transport rotary wing aircraft typically provide a design average noise level limit with the environmental control system (fans, vent air and cooling/heating system) turned off of approximately 75 dB SIL4. The SIL4 (Speech Interference Level 4) noise measurement metric is the arithmetic average of the sound pressure levels in the 500, 1000, 2000 and 4000 Hz octave bands. It rates steady noise according to interference with conversation between two people.

Various known acoustic absorption systems have been provided to reduce noise levels within the cabin to below desired SIL4 values. One known acoustic absorption system hangs bags stuffed with loose acoustic batting between frame members of the airframe as a primary determinant of aircraft interior noise levels is the response of the airframe to vibration excitation. Disadvantageously, such batting is relatively heavy in weight and provides minimal noise attenuation within rotary wing aircraft due to inherent flanking path leakage around the batting coupled with the complex frequency structure and the intense amplitudes of the aircraft transmission gear noise signatures.

SUMMARY

An airframe according to an exemplary aspect of the present invention includes: an airframe section having a multitude of frame members to define a multitude of frame voids; an outer skin mounted to the multitude of frame members; a multitude of foam portions, each of the multitude of foam portions mounted within one of the multitude of frame voids through an interference fit; and a mass barrier layer mounted to the multitude of frame members and adjacent to each of the multitude of foam portions to provide a contiguous layer to seal the foam portions within the respective multitude of frame voids.

A rotary-wing aircraft according to an exemplary aspect of the present invention includes: in airframe section within a cabin of the rotary wing aircraft having a multitude of frame members to define a multitude of foam voids, the airframe section having at least one window area; an outer skin mounted to the multitude of frame members, the at least one window area through the outer skin between a first multitude of frame members; a multitude of foam portions, each of the multitude of foam portions mounted within one of the multitude of foam voids through an interference fit, a window foam portion of the multitude of foam portions mounted within the first multitude of frame members through an interference fit to surround the at least one window area; and a mass barrier layer mounted to the multitude of frame members and the window foam portion, the mass barrier layer adjacent to the multitude of foam portions to provide a contiguous layer to seal the foam portions within the respective multitude of foam voids and surround the at least one window area.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
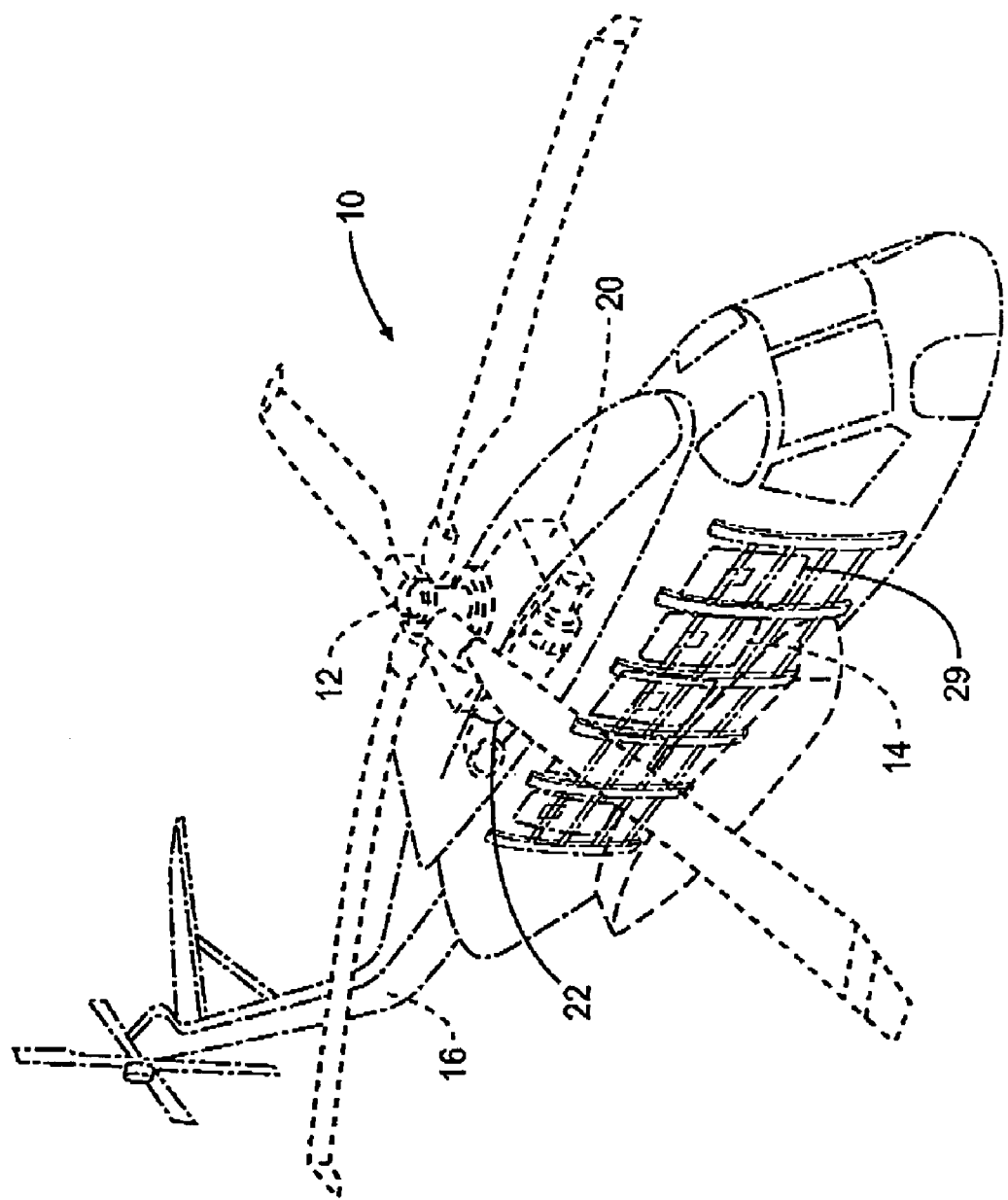
FIG. 1 is a general perspective view an exemplary rotary wing aircraft embodiment for use with the present invention.

FIG. 1 schematically illustrates a rotary-wing aircraft 10 having a main rotor assembly 12. The aircraft 10 includes an airframe 14 having an extending tail 16 which mounts an anti-torque rotor 18. The main rotor assembly 12 is driven through a transmission (illustrated schematically at 20) by one or more engines 22. Although a particular helicopter configuration is illustrated in the disclosed embodiment, other machines such as turbo-props, tilt-rotor and tilt-wing aircraft will also benefit from the present invention.

Figure 2:
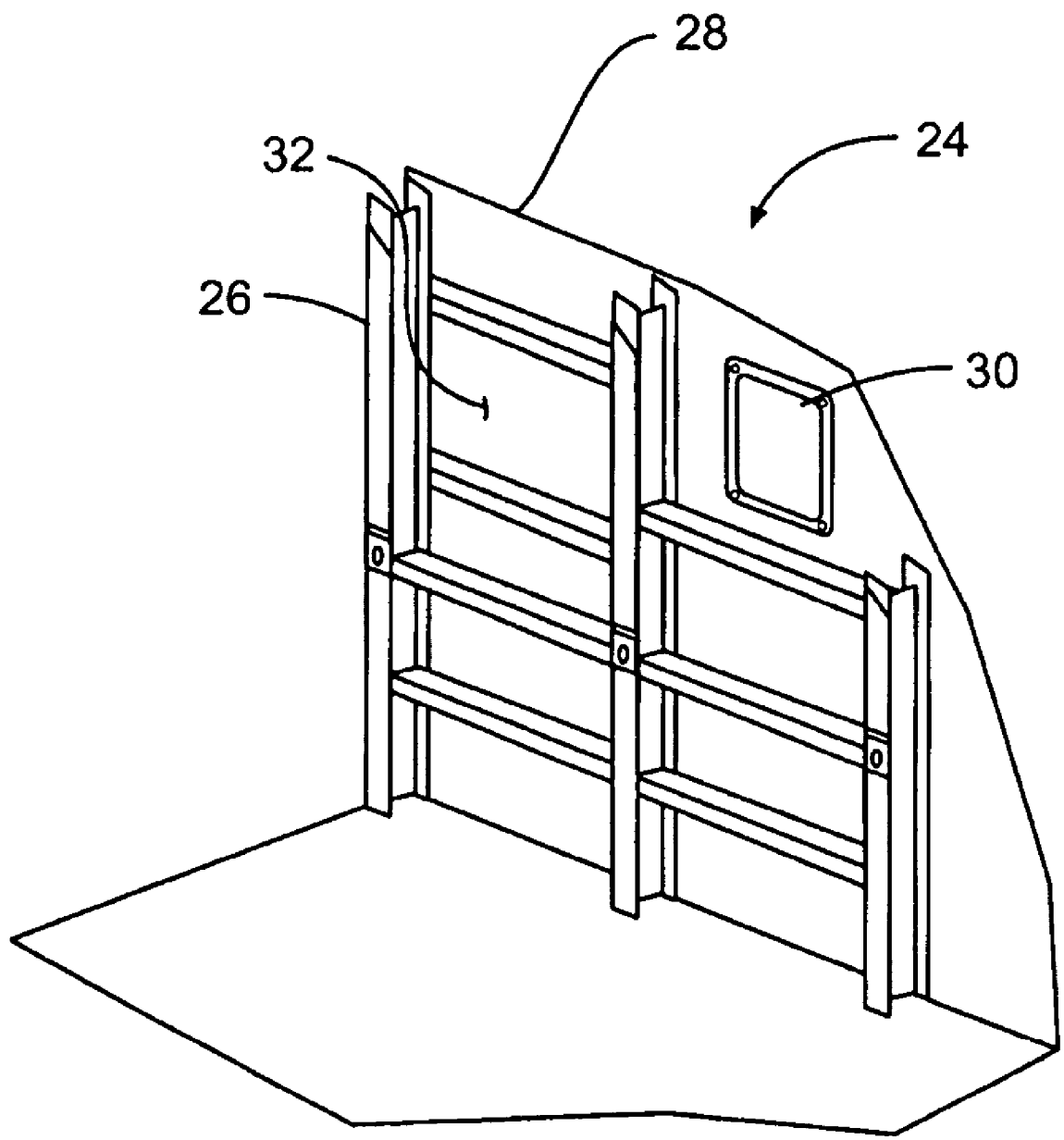
FIG. 2 is a plan view of an airframe section for use with an acoustic absorption system of the present invention.

Referring to FIG. 2, an airframe section 24 within a cabin of the rotary wing aircraft includes a multitude of frame members 26 which support an outer skin 28. The airframe section 24 is the outer structure of the aircraft 10 and may include one or more window area 30. The window areas 30 are typically located through the outer skin 28 between the multitude of frame members 26. The multitude of frame members 26 are typically arranged in a rectilinear pattern, however, any arrangement may be used with the present invention. The multitude of frame members 26 defines a multiple of frame voids 32. The frame voids 32 are effectively spaces adjacent the outer skin 28 for a depth defined by the frame members 26.

Figure 3:
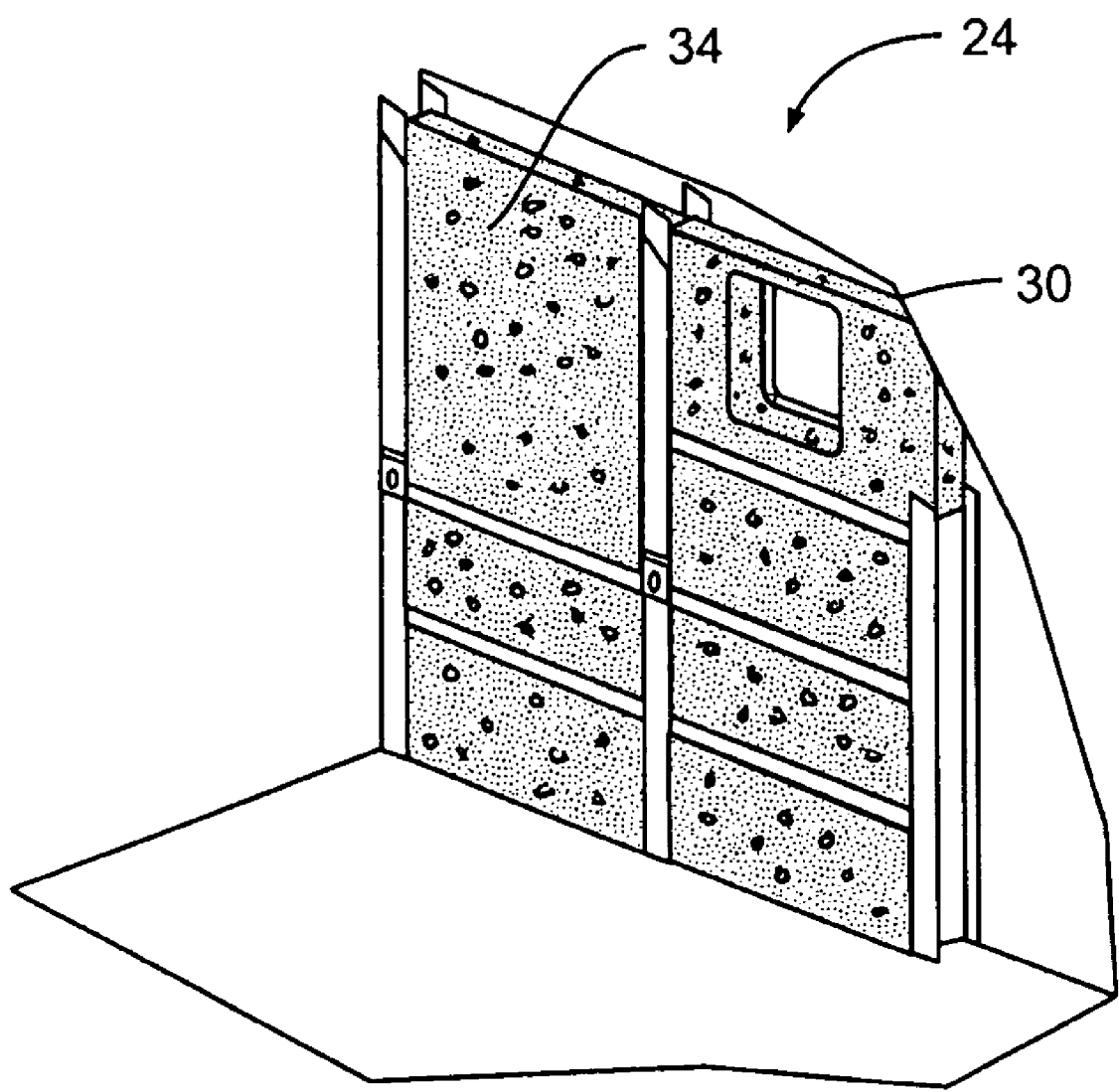
FIG. 3 is a plan view of an airframe section with foam portions which completely fill in frame voids within the airframe panel.

Referring to FIG. 3, an acoustic absorption system 31 according to the present invention fills each of the frame voids 32 with a foam portion 34. The foam portion 34 according to one non-limiting embodiment is a Polyimide Foam, Solimide, such as Degussa AG Solimide® TA-301 Polyimide Foam which is a lightweight foam that had both fire-resistant and posse's acoustical properties. Solimide foam commonly used in military applications and is also known as MIL-T-24708.

The foam portions 34 are each interference or "force" fit into the frame voids 32. That is, the foam portions 34 are shaped to completely fill each of the frame voids 32. According to one non-limiting embodiment, each foam portion 34 is shaped to be larger than the particular void, then force fit into the void 32 between the multitude of frame members 26 which surround that void 32. Applicant has determined that interference or "force" fit into the frame voids 32 provides significant unexpected advantages over conventional aircraft noise insulation.

Figure 4:
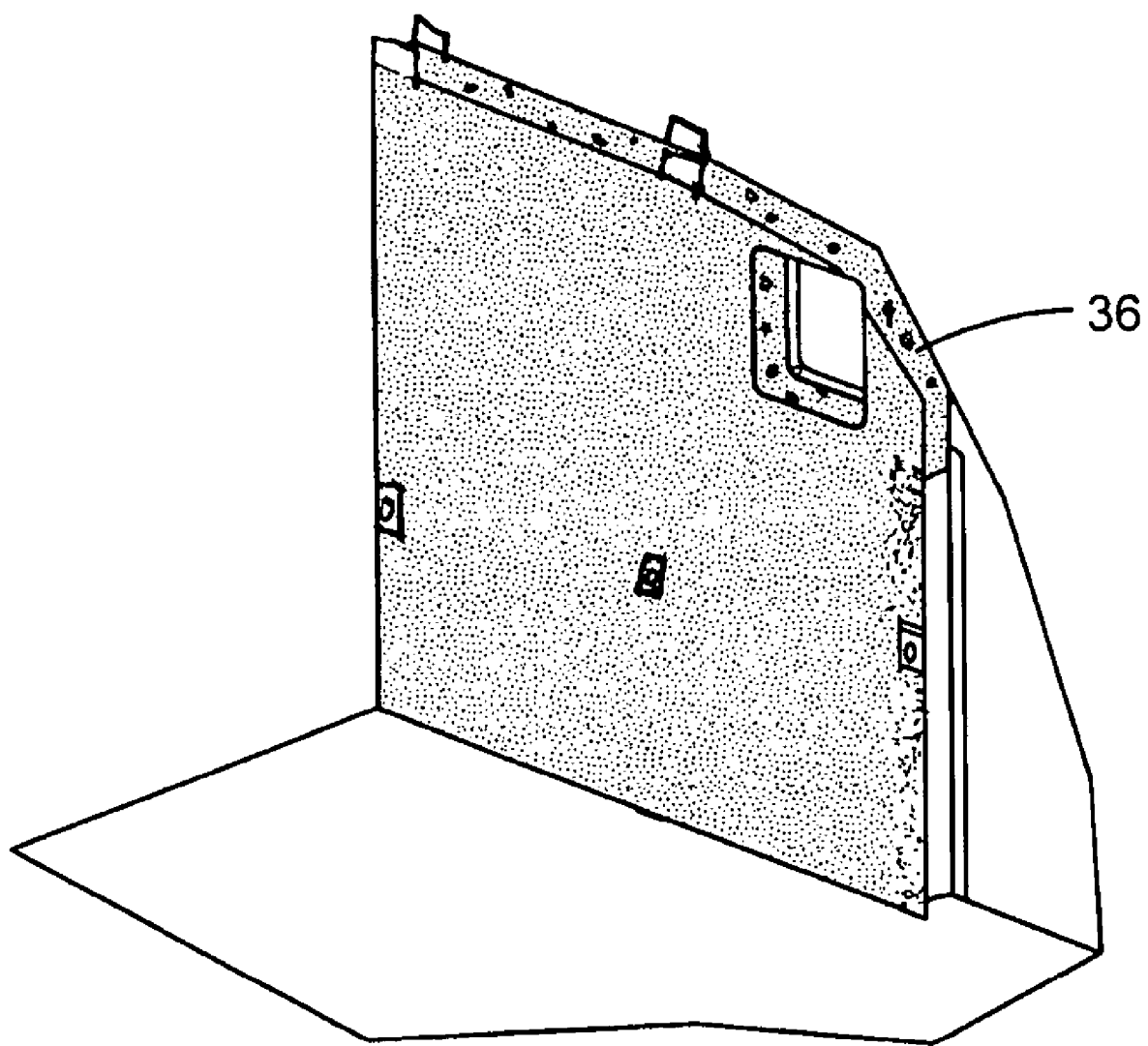
FIG. 4 is a plan view of an airframe section with a mass barrier layer adhered over the foam portions and the airframe panel.

Referring to FIG. 4, once each of the frame voids 32 are filled with foam portions 34, a mass barrier layer 36 is adhered over the foam portions 34 and to the multitude of frame members 26. The mass barrier layer 36 according to one non-limiting embodiment is a single layer of virgin (high grade) vinyl which is mass loaded with barium sulfate powder, or similar dense material to increase its mass, and has a thickness of approximately ¹⁄₁₆ to ¼ inches such as DURASONIC manufactured by Duracoat Corp. of Riverside, Calif., U.S.A. While vinyl is the preferred material because of its limpness, high inherent damping and relatively high density, the mass barrier layer 36 can be made from a variety of alternate materials, such as silicone or rubber sheet material. The materials used are selected on the basis of limpness, lowest stiffness, high relative surface density, resistance to fire, low levels of toxic fume emission when exposed to flame, expense, etc.

Figure 5:
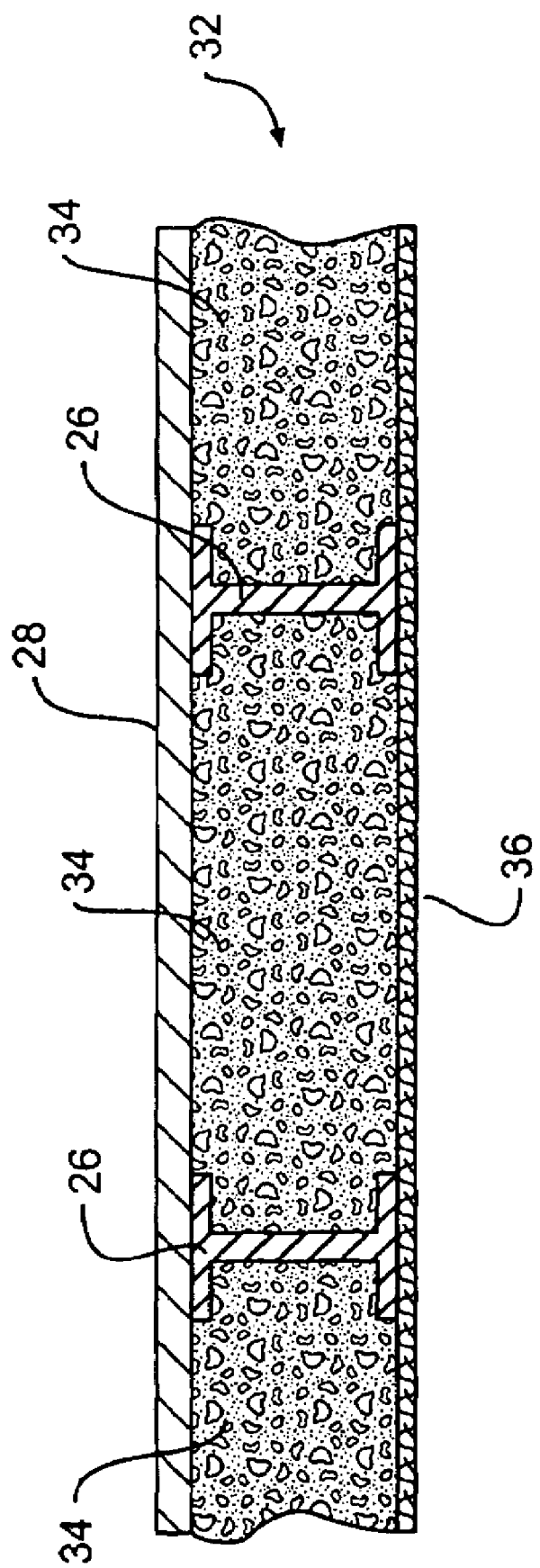
FIG. 5 is a sectional view of the airframe section of FIG. 4 taken along ht line 5-5 in FIG. 4.

The mass barrier layer 36 is a contiguous layer adhered across the multitude of frame members 26 to seal the airframe frame voids 32 to make use of mass-air-mass principles which reduce flanking path leakage around the foam portions 34 (FIG. 5). The foam portions 34 mounted about the window areas 30 operate as a termination locators for attachment of the mass barrier layer 36.

Figure 6A:
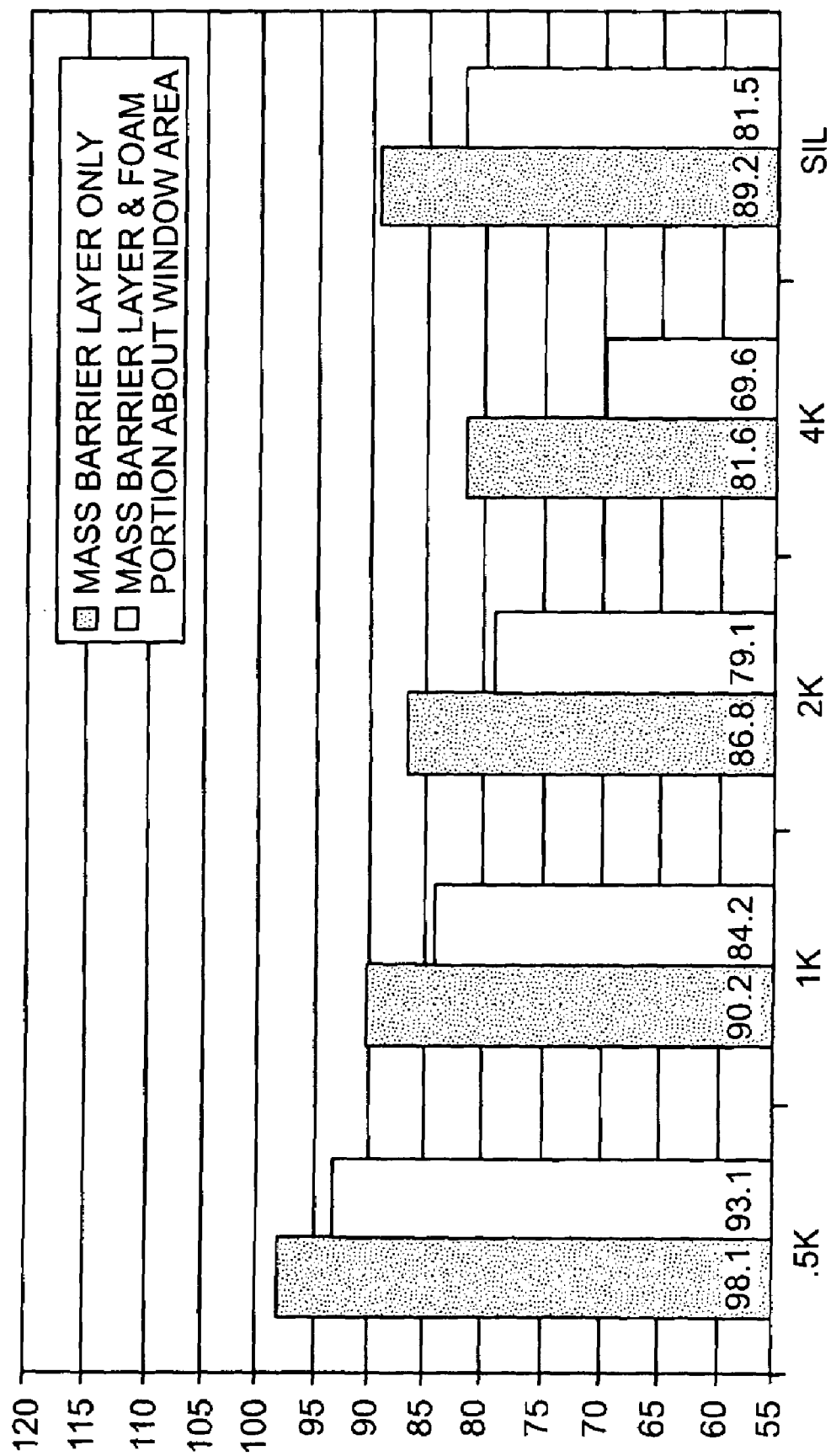
FIG. 6A is a graphical representation of the acoustic reductions provided by an acoustic absorption system according to the present invention adjacent a window opening.
Figure 6B:
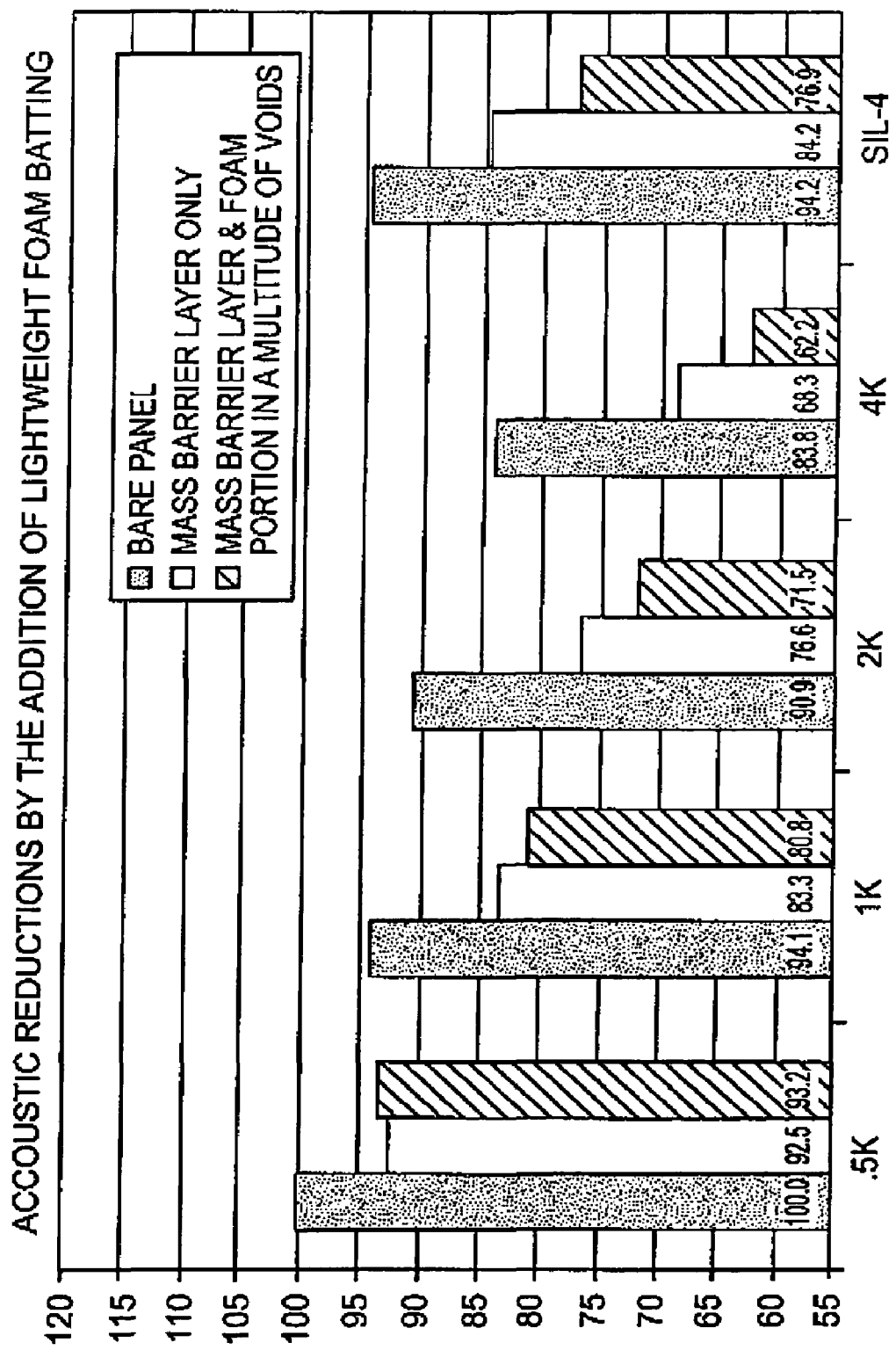
FIG. 6B is a graphical representation of the acoustic reductions provided by an acoustic absorption system throughout the airframe section according to the present invention.

Referring to FIGS. 6A and 6B, the effect of the acoustic absorption system 31 made in accordance with the present invention is illustrated in graphic format. Proof of concept testing was performed on an airframe section installed between Reverberation and Anechoic Chambers. The airframe section was subjected to noise and vibration excitation towards reproducing the conditions encountered during flight and measurements were made to determine the levels of noise radiating into the cabin area from the bare frame. When the airframe section was provided with the acoustic absorption system 31 about the window openings alone, testing (FIG. 6A) has indicated that the present invention has provided an average noise level reduction on approximately 8 dBA reduction in the amount of leakage around the window area 30. When the entire airframe section was provided with the acoustic absorption system 31 testing (FIG. 6B) has indicated that the present invention has provided an average noise level reduction on approximately 7.3 dBA from a mass barrier later equipped airframe section with minimal weight increase.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An airframe comprising:
    an airframe section having a multitude of frame members to define a multitude of frame voids;
    an outer skin mounted to said multitude of frame members;
    a multitude of foam portions, each of said multitude of foam portions mounted within one of said multitude of frame voids through an interference fit; and
    a mass barrier layer mounted to said multitude of frame members adjacent and separate from each of said multitude of foam portions to provide a contiguous layer to seal said foam portions within said respective multitude of frame voids.

2. The airframe as recited in claim 1, wherein said multitude of frame members define a rectilinear pattern.

3. The airframe as recited in claim 1, wherein said airframe component includes a window area, at least one of said multitude of foam portions comprising a window foam portion which surrounds said window area.

4. The airframe as recited in claim 3, wherein said mass barrier layer is removably attached to said window foam portions that surrounds said window area to operate as a termination locator for attachment of said mass barrier layer.

5. The airframe as recited in claim 1, wherein said mass barrier layer is bonded to said multitude of frame members.

6. The airframe as recited in claim 1, wherein said mass barrier layer is removably attached to said multitude of frame members.

7. The airframe as recited in claim 1, wherein said mass barrier layer is limp adjacent to each of said multitude of foam portions, said mass barrier layer adhered over and not attached to said multitude of foam portions.

8. A rotary-wing aircraft comprising:
    an airframe section within a cabin of the rotary wing aircraft having a multitude of frame members to define a multitude of foam voids, said airframe section having at least one window area;
    an outer skin mounted to said multitude of frame members, said at least one window area through said outer skin between a first multitude of frame members;
    a multitude of foam portions, each of said multitude of foam portions mounted within one of said multitude of foam voids through an interference fit, a window foam portion of said multitude of foam portions mounted within said first multitude of frame members through an interference fit to surround said at least one window area; and
    a mass barrier layer mounted to said multitude of frame members and said window foam portion, said mass barrier layer adjacent to and separate from said multitude of foam portions to provide a contiguous layer to seal said foam portions within said respective multitude of foam voids and surround said at least one window area.

9. The aircraft as recited in claim 8, wherein said mass barrier layer is removably attached to said multitude of frame members and said window foam portion.

10. The aircraft as recited in claim 8, wherein said mass barrier layer is limp adjacent to each of said multitude of foam portions, said mass barrier layer adhered over and not attached to said multitude of foam portions.

* * * * *

UNITED STATES PATENT AND TRADEMARK OFFICE
CERTIFICATE OF CORRECTION

PATENT NO. : 7,578,468 B2 Page 1 of 1
APPLICATION NO. : 11/017602
DATED : August 25, 2009
INVENTOR(S) : Stuart K. Drost It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 8 days.

Signed and Sealed this

Seventh Day of September, 2010

David J. Kappos
*Director of the United States Patent and Trademark Office*